United States Patent

Harper

[11] 4,108,160
[45] Aug. 22, 1978

[54] SOLAR WATER HEATING APPARATUS

[76] Inventor: William Anthony Harper, 7727 Baseline Rd., Boulder, Colo. 80303

[21] Appl. No.: 808,716

[22] Filed: Jun. 21, 1977

[51] Int. Cl.² .............................................. F24J 3/02
[52] U.S. Cl. ................................................... 126/271
[58] Field of Search ................ 126/270, 271; 237/1 A

[56] References Cited

U.S. PATENT DOCUMENTS

| | | | |
|---|---|---|---|
| 3,427,808 | 2/1969 | Butcher | 126/270 |
| 3,952,519 | 4/1976 | Watson | 126/271 |
| 4,021,895 | 5/1977 | Morse et al. | 126/271 |

Primary Examiner—Carroll B. Dority, Jr.

[57] ABSTRACT

A utilization of solar energy to heat a domestic hot water supply wherein an apparatus employs fluid pressure generated by solar radiation as both the motive force of pumping and controlling agent for maximizing heat gain and timing of required transfers of the heat absorbing medium within the system. As the temperature of a simple solar collector rises when exposed to solar radiation, pressure is developed at a predetermined temperature by the vaporization of a fluid whereby a positive fluid pressure directly transfers a heat absorbing medium such as water into a second flat plate collector to absorb available solar generated heat developed by the collector. Upon removal of the solar radiation and concomitant collapse of the energy emission/absorption equilibrium in both collectors, the fluid pressure becomes negative with the condensation of the vapor and transports the water and its absorbed heat energy from the solar collector. The hot transport medium is transferred to a heat exchanger to heat a domestic water supply and transferred to a heat exchanger to heat a domestic water supply and to contribute to space heating needs. Upon the return of the next cycle of solar radiation the system responds by transferring fluids under pressure to collect available energy in the collector. Such a system is protected from freeze damage and controls the undesired loss of heat energy during times when solar radiation is inadequate for a heat buildup.

6 Claims, 1 Drawing Figure

SOLAR WATER HEATING APPARATUS

BACKGROUND OF THE INVENTION

The present invention relates to domestic hot water systems which utilize solar radiation as a source of heat and specifically to such apparatus using solar radiation in the form of heat to supply the motive force and controlling instrumentality for transfer and control of a heat absorbing fluid so as to maximize heat gain and preclude heat loss. The power and control factor, which is the subject of this invention, is provided by the predetermined vaporization of a fluid in phase transition which in turn generates fluid pressure acting upon a heat transporting fluid.

Essentially only two methods have been used to pump a fluid heat absorbing medium such as water into and from a solar collector. The first uses the technique of a thermosiphon whereby hot water rises by virtue of gravity out of the collector to be stored in a tank placed higher than the collector. This system is obviously subject to freeze damage and must place major design restrictions on the installation. Additionally, if the water is protected by antifreeze and a heat exchanger is used the water in the collector suffers substancial heat loss in the cold and must first reabsorb this loss before becoming operational again. This consideration greatly reduces the efficiency of the entire system. The second method is to employ an electric pump to circulate the water through the collector. Freeze protection is provided by either draining the collector or by using antifreeze; both these methods create substantial heat losses. Control in a pump system is provided by conventional electronic means employing relays, themostats, and valves. Such control is a major cost element in such operations and by virtue of its complexity creates maintenance concerns. While the thermosiphon system is simple, it is subject to freeze damage and imposes design considerations not easily accepted. It is also somewhat inefficient because of night cooling. The second system using the pump is higher in cost and complexity in addition to requiring outside energy to function properly. These systems comprise the present level of art as found in works such as Farrington Daniels' *Direct Use Of The Sun's Energy* (1964), W. M. Foster's *Homeowner's Guide to Solar Heating and Cooling* (1976), and J. C. McVeigh's *Sun Power* (1977).

The present invention eliminates or lessens the undesirable features of both these conventional hot water systems. Primarily, the present invention provides a single mechanism that both transfers a fluid heat absorbing medium such as water into a simple flat plate solar collector and provides a control means by virtue of this same mechanism that controls this transfer in such a manner as to maximize the heat gain. Further, this natural analog system conserves heat by removal of all fluid from the collect when cooling occurs and thus provides freeze protection. This simple mechanism acts as both pump and electronic controls of the pump system and is simple as the thermosiphon's operation, yet has neither the cost nor restraints of either operation.

Essentially the present invention comprises a vapor pressure pump utilizing the same solar radiation energy used to heat the water transport medium, the strength of the radiation acts as the control for the system by analog means. When solar radiation is present to heat the water transport medium, other elements of the same radiation are being trapped in a second fluid tight flat plate collector which contains a flexible vapor bag containing a fluid which substancially vaporizes at a predetermined temperature and pressure. Air surrounding the vapor bag is placed under pressure by the vaporization and in turn transmits this pressure to an enclosed storage tank that in turn discharges water into a first solar collector designed to heat a water medium. The water begins to absorb the solar heat trapped within the collector. When solar radiation is eliminated from the pressure generating collector by either natural or contrived means such as a fluid shade, the vapor condenses and creates a negative pressure which withdraws the heated water from its collector and places it in a holding tank for storage. Thus a form of active heating is created that does not require external power or a separate network of control.

Accordingly, it is an object of the present invention to provide a domestic hot water heating system using solar energy for heat gain and transportation of heat bearing fluids by means of solar generated fluid pressures.

Another object of the invention is to create a control means that optimizes the collection and retention of solar created heat by means of solar generated fluid pressures.

Other objects, advantages and novel features of the invention will become apparent from the following detailed description.

DESCRIPTION OF THE PREFERRED EMBODIMENTS

Figure 1:
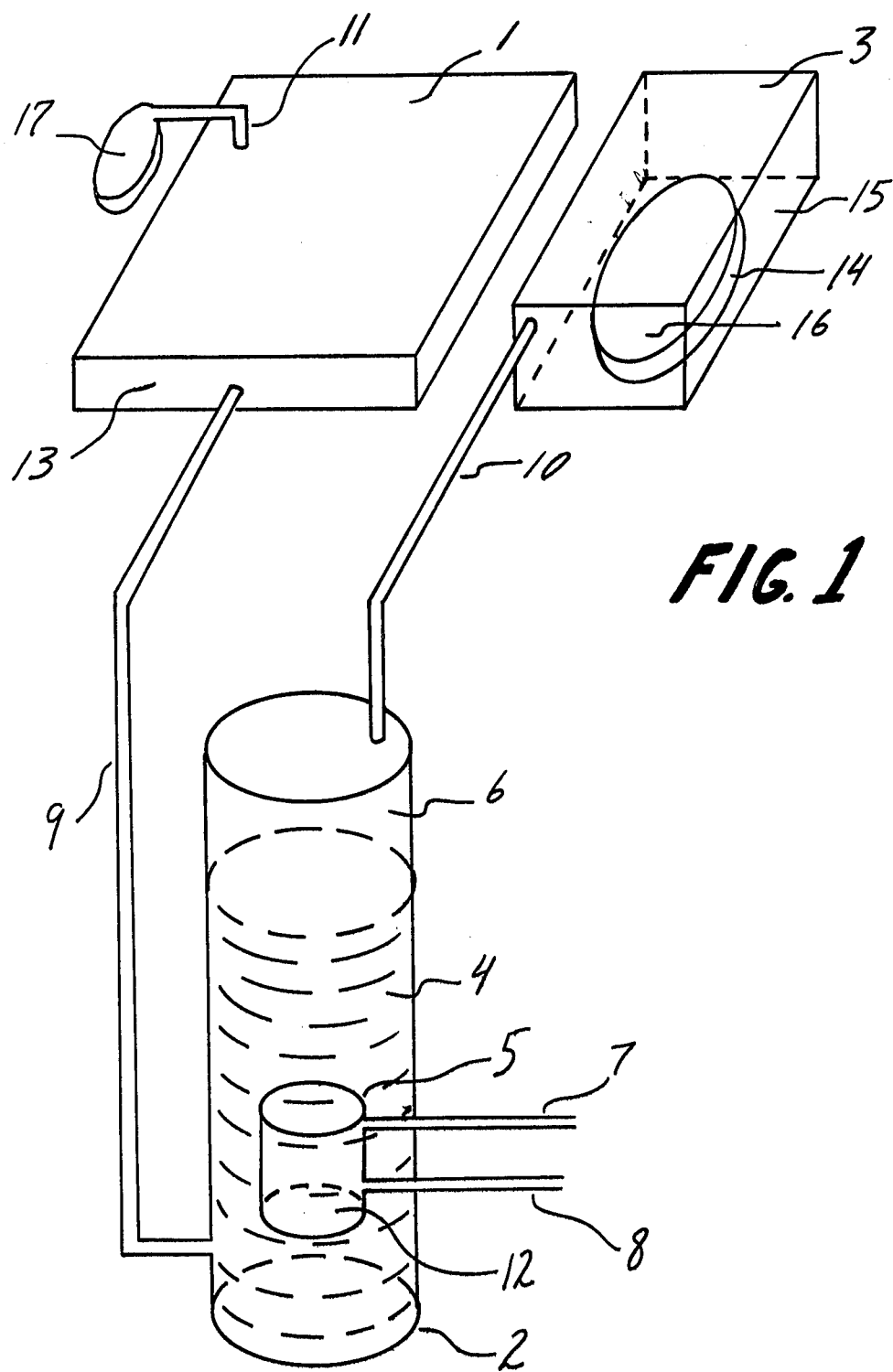
FIG. 1 is a simplified perspective view showing the two flat plate solar collectors, heat exchange tank, vapor bag, connecting means, fluid transport medium, domestic water lines and expansion bag as an example of embodiment.

In Fig. 1 the major operational units of the invention are shown. While the flat plate solar collector for heating water 1 and the heat exchanger tank 2 are well known elements of solar water heating systems, the inclusion of a second simple flat plate solar collector 3 for generation of vapor pressures used for moving and controlling the movement of a heat absorbent transport medium 4 between the solar hot water collector 1 and heat exchange tank 2 is novel. It is a major element of the invention herein described.

As solar radiation strikes both collectors, each develops heat until an absorption/emission equilibrium is created which is typically about 140° F for simple collectors. The pressure generating collector 3 is a substantially inflexible fluid tight container that encloses at least two fluids, a first fluid with a significantly different boiling point than the second fluid. In this example the first fluid has a higher boiling point and is 1,2-dichloro-1,1,2,2-tetrafluoroethane with a boiling point of 118° F at 14.7 psia. The second fluid is simple air with a corresponding boiling point of −295° F. Other applications might have a first fluid with a boiling point of 97° F such as pentane and a second fluid such as water at a boiling point of 212° F. In this case the first fluid has a lower boiling point than the second. The significant element here is that the two fluids have boiling points which are significantly apart so that one fluid undergoes a phase transition within the range of temperatures selected and the second does not respond within the same range. In this example of air and dichlorotetrafluorethane the later is contained within a vapor bag 14 to prevent mixing of the two fluids. To the first fluid within the vapor bag 14 dyes and scents are added to provide detection means should the vapor bag 14 rupture. As temperatures rise within the pressure generating collector 3 the first fluid boils and becomes vapor 16 which occupies some 212 times the volume of the liquid phase. The flexible polymeric bag of gas impermeable film forming the vapor bag 14 expands as the vapor develops and displaces by pressure the second fluid, air 15, from the collector 3. The pressurized air 15 passes through the air pressure pipe 10 into the heat exchange tank 2. In the tank 2 the tank air 6 becomes pressurized and discharges the fluid heat absorbing water medium 4 out of the tank 2 by means of an insulated water pipe 9 into the solar water heating collector 1. In this example about half the water medium 4 remains in the tank 2 to heat the domestic water 12 by means of a heat exchanger 5 which is submerged in the water medium 4. Cold main water 8 entering the heat exchanger 5 is heated before leaving as domestic hot water 7.

When the solar radiation is terminated and no longer developing heat energy in the collectors the emission/absorption equilibrium in the pressure collector 3 collapses and condensation of vapor 16 within the vapor bag 14 produces a partial vacuum in the system. Negative air pressure is transmitted into the heat exchange tank 2 and the solar heated water transport medium 4 is pulled from the water heating collector 1 and mixes with the remaining storage and transport medium of water 4. The newly heated water medium 4 continues to yield heat through the domestic heat exchanger 5 as domestic water 12 is withdrawn and used.

As an essentially closed system no material is released to the atmosphere, no external power is required aside from solar radiation, and only two moving parts are found in the entire system. The two moving elements are two flexible polymeric bags. The first has been described as the vapor bag 14 in the pressure collector 3; the second is a vapor recovery bag 17 fitted to the air vent 11 on the water heating collector 1 for the purpose of retaining escaping water vapor from the transport medium 4. The vapor recovery bag 17 expands as the collector 1 expells air when filling with the transport medium 4 and retains vapors that might escape and eventually require periodic replenishing of the transport medium 4.

Use of various vaporizing fluids with differing boiling points and loaded lift factors creating back pressures allows the placement of collectors and heat exchangers in a wide variety of relationships. For example, if trichlorofluoromethane with a boiling point of 75° F is used as the vaporizing fluid it can be placed under a pressure load of 14.7 psig so that its phase transition temperature is raised to 113° F. If the collector should be roughly 34 feet above the tank the entry of the transport medium into the collector would occur at about the temperature of 113° F. While this example has used the pressure of a water column to creat back pressure, the same load can be created by pressure loaded valves designed for static conditions.

Pressurized fluids developed and controlled by the direct use of solar radiation has provided an analog system for optimizing solar heat gain and retention in a transported fluid medium for the purpose of heating a domestic hot water supply. Uses of the domestic hot water would include laundry, bathing, space heating and a wide variety of like uses. Additionally, the system described could be used in agriculture for such matters as heating a hen house or pig sties or an early spring hot bed. In other applications a simple version of this system consist of two oil drums, some plastic pipe, a couple of black bags and a mud hovel to heat with solar energy.

While both method and embodiments of the invention have been illustrated in detail, it is to be expressly understood that the invention is not limited thereto. Various changes may also be made in the design and arrangements of the parts without departing from the spirit and scope of the invention as the same will now be understood by those skilled in the art.

What is claimed is:

1. Apparatus for transducing solar energy into direct pressurized fluid control and transfer of a heat absorbent transport medium used in a domestic hot water system, comprising:

a substantially inflexible fluid-tight solar heat collector of predetermined dimensions;

a first fluid volumetrically confined in said collector, said first fluid having a phase transition temperature beyond the predetermined range developed by said collector;

means providing for the pressurized transfer of a predetermined portion of said first fluid beyond said collector;

a second fluid volumetrically confined within said collector, said second fluid having a predetermined vaporization phase transition temperature point within the predetermined range developed by said collector; and, means of transporting a heat absorbent medium between a heat exchange means and a solar heat collecting means which respones to said pressurized first fluid as developed by the solar heat induced phase transition of said second fluid.

2. The apparatus of claim 1 wherein said second fluid is confined within at least one flexible sealed polymeric bag of a substantially gas impermeable film material forming a vapor bag for separation of said first and second fluids.

3. The apparatus of claim 2 wherein coloring agents are added to said second fluid as a visual indicator of leakage of said vapor bag.

4. The apparatus of claim 2 wherein a scenting agent is added to said second fluid as an olfactory indicator of leakage of said vapor bag.

5. The apparatus of claim 1 wherein a flexible polymeric bag is employed as an expansion chamber and vapor recovery means of said heat absorbent medium and is attached to said solar heat collecting means so as to form a closed system of fluids.

6. The apparatus of claim 1 wherein the phase transition temperature of said second fluid is shifted by means of predetermined load pressures.

* * * * *